US012401017B2

(12) United States Patent
Procter (10) Patent No.: US 12,401,017 B2
(45) Date of Patent: Aug. 26, 2025

(54) POSITIVE ELECTRODE ACTIVE MATERIAL AND NONAQUEOUS ELECTROLYTE SECONDARY BATTERY USING THE POSITIVE ELECTRODE ACTIVE MATERIAL

(71) Applicant: Prime Planet Energy & Solutions, Inc., Tokyo (JP)

(72) Inventor: Momoko Procter, Seto (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 131 days.

(21) Appl. No.: 17/564,224

(22) Filed: Dec. 29, 2021

(65) Prior Publication Data
US 2022/0216457 A1 Jul. 7, 2022

(30) Foreign Application Priority Data
Jan. 5, 2021 (JP) .................. 2021-000514

(51) Int. Cl.
*H01M 4/131* (2010.01)
*H01M 4/02* (2006.01)
*H01M 10/0525* (2010.01)

(52) U.S. Cl.
CPC ....... *H01M 4/131* (2013.01); *H01M 10/0525* (2013.01); *H01M 2004/028* (2013.01)

(58) Field of Classification Search
CPC ......... H01M 10/0525; H01M 2220/20; H01M 4/131; H01M 2004/028
See application file for complete search history.

(56) References Cited

U.S. PATENT DOCUMENTS

| | | | |
|---|---|---|---|
| 2003/0096166 A1 | 5/2003 | Imoto et al. | |
| 2011/0293507 A1* | 12/2011 | Dambournet et al. | C01G 23/047 423/598 |
| 2015/0086850 A1* | 3/2015 | Yokouchi et al. | H01M 4/131 |
| 2018/0254477 A1 | 9/2018 | Horikawa et al. | |
| 2020/0388840 A1 | 12/2020 | Horikawa et al. | |
| 2021/0296642 A1* | 9/2021 | Yamamoto | H01M 4/505 |
| 2023/0089526 A1* | 3/2023 | Zhang et al. | H01M 4/36 |

FOREIGN PATENT DOCUMENTS

| | | |
|---|---|---|
| CN | 108539139 A | 9/2018 |
| CN | 111430679 A | 7/2020 |
| CN | 112054193 A | 12/2020 |
| EP | 2843736 A1 | 3/2015 |
| EP | 3653581 A1 | 5/2020 |

(Continued)

*Primary Examiner* — Jonathan G Leong
*Assistant Examiner* — Kan Luo
(74) *Attorney, Agent, or Firm* — HAUPTMAN HAM, LLP (57) ABSTRACT

The present disclosure provides a positive electrode active material capable of imparting a nonaqueous electrolyte secondary battery with excellent output characteristic and cycle characteristic. The positive electrode active material herein disclosed includes a core part including a lithium composite oxide, a first region formed on at least a partial surface of the core part, and including tungsten (W), and a second region formed on at least a partial surface of the first region, and including titanium (Ti). The W concentration of the first region with TEM-EDX analysis is higher than the W concentration of the core part.

11 Claims, 3 Drawing Sheets

(56) References Cited

FOREIGN PATENT DOCUMENTS

| | | | |
|---|---|---|---|
| JP | 2002184400 | A | 6/2002 |
| JP | 2003132940 | A | 5/2003 |
| JP | 201599646 | A | 5/2015 |
| JP | 2017107743 | A | 6/2017 |
| JP | 2017188211 | A | 10/2017 |
| JP | 2018147726 | A | 9/2018 |
| JP | 201919047 | A | 2/2019 |
| JP | 2020050562 | A | 4/2020 |
| JP | 2020072057 | A | 5/2020 |

\* cited by examiner

POSITIVE ELECTRODE ACTIVE MATERIAL AND NONAQUEOUS ELECTROLYTE SECONDARY BATTERY USING THE POSITIVE ELECTRODE ACTIVE MATERIAL

CROSS REFERENCE TO RELATED APPLICATIONS

The present application claims the priority based on Japanese Patent Application No. 2021-000514 filed on Jan. 5, 2021, the entire contents of which are incorporated by reference in the present specification.

BACKGROUND OF THE DISCLOSURE

1. Technical Field

The present disclosure relates to a positive electrode active material. The present disclosure also relates to a nonaqueous electrolyte secondary battery using the positive electrode active material.

2. Description of Background

In recent years, a nonaqueous electrolyte secondary battery such as a lithium ion secondary battery has been preferably used as a portable power supply for a personal computer, a portable terminal, or the like, or a power supply for driving automobiles such as a battery electric vehicle (BEV), a hybrid electric vehicle (HEV), and a plug-in hybrid electric vehicle (PHEV).

More and more nonaqueous electrolyte secondary batteries are used and have been required to be further enhanced in performances with the spread thereof. For the positive electrode of such a nonaqueous electrolyte secondary battery, generally, a positive electrode active material capable of occluding and releasing ions serving as electric charge carriers is used. In order to improve the performances of the nonaqueous electrolyte secondary battery, coating is provided on the surface of the positive electrode active material. As one example of such coating, Japanese Patent Application Publication No. 2015-99646 discloses the technology of coating the surface of the positive electrode active material with titanium dioxide ($TiO_2$) in order to improve the output characteristic, and the like. Further, Japanese Patent Application Publication No. 2019-19047 discloses the technology of concentrating the compound including tungsten and lithium on the surface layer of the primary particle present on the surface or the inside of the secondary particle of a positive electrode active material (lithium metal composite oxide) and the grain boundary among primary particles in order to reduce the reaction resistance, and to generate a positive electrode active material with high crystallinity.

SUMMARY

However, the present inventors conducted a close study, and as a result, found the following: with a nonaqueous electrolyte secondary battery using the positive electrode active material provided with coating by the related art, the internal resistance of the battery is still large, and the output characteristic is insufficient. Further, the present inventors found that the resistance increase rate after repeating charging and discharging the nonaqueous electrolyte secondary battery is large, and the cycle characteristic is insufficient. Still further, the present inventors found the following: coating of the positive electrode active material with tungsten provides the effect of improving the output characteristic and the cycle characteristic of the nonaqueous electrolyte secondary battery; on the other hand, when the concentration of tungsten is too high, tungsten is eluted from the positive electrode, and is precipitated at the negative electrode. The present inventors also found that precipitation of tungsten at the negative electrode facilitates precipitation of lithium on the negative electrode, which can cause an increase in internal resistance of the battery.

The present disclosure was completed in view of such circumstances. It is a main object thereof to provide a positive electrode active material capable of imparting a nonaqueous electrolyte secondary battery with excellent output characteristic and cycle characteristic. Further, it is another object thereof to provide a nonaqueous electrolyte secondary battery using such a positive electrode active material.

In order to achieve the foregoing objects, the positive electrode active material herein disclosed is provided. The positive electrode active material herein disclosed includes: a core part including a lithium composite oxide; a first region formed on at least a partial surface of the core part, and including tungsten (W); and a second region formed on at least a partial surface of the first region, and including titanium (Ti). Herein, the W concentration of the first region with TEM-EDX analysis is higher than the W concentration of the core part.

As described above, inclusion of the first region having a higher tungsten concentration than that of the core part can impart a nonaqueous electrolyte secondary battery with excellent output characteristic and cycle characteristic. Further, inclusion of the second region including Ti can suppress elution of tungsten, and can further exhibit the effect of addition of high-concentration tungsten. With such a configuration, it is possible to provide a positive electrode active material for imparting a nonaqueous electrolyte secondary battery with excellent output characteristic and cycle characteristic. Incidentally, in the present specification, the "output characteristic" is evaluated by the magnitude of the initial resistance of a secondary battery, and the "cycle characteristic" is evaluated by the resistance increase rate after charging and discharging cycle.

With a preferable one aspect of the positive electrode active material herein disclosed, the atomic ratio (Ti/W) of Ti to W in the overall positive electrode active material is 0.2 or more and 9 or less.

With such a configuration, it is possible to provide a positive electrode active material for imparting a nonaqueous electrolyte secondary battery with further excellent output characteristic and cycle characteristic.

With another preferable one aspect of the positive electrode active material herein disclosed, the second region includes $TiO_2$ and/or a composite oxide including Li and Ti as titanium-containing compounds. Further, with a still other preferable one aspect, the second region includes $TiO_2$ as the titanium-containing compound, and the Ti concentration of $TiO_2$ identified as brookite type $TiO_2$ based on Ti peak analysis of XAFS with the Ti concentration of the titanium-containing compound taken as 100 mol % is 10 mol % or more.

With such a configuration, the effect of inclusion of the second region including Ti is exhibited at a higher level.

Further, in order to achieve the foregoing other object, a nonaqueous electrolyte secondary battery is provided which includes a positive electrode, a negative electrode, and a nonaqueous electrolyte. Herein the positive electrode includes the positive electrode active material.

With such a configuration, it is possible to provide a nonaqueous electrolyte secondary battery having an excellent output characteristic and an excellent cycle characteristic.

DETAILED DESCRIPTION

Below, referring to the accompanying drawings, preferable embodiments of the present disclosure will be described. It is naturally understood that the embodiments herein described should not be construed as restring the present disclosure. Incidentally, matters necessary for executing the present disclosure, except for matters specifically referred to in the present specification (e.g., a general configuration of a nonaqueous electrolyte secondary battery not characterizing the present disclosure) can be grasped as design matters of those skilled in the art based on the related art in the present field. The present disclosure can be executed based on the contents disclosed in the present specification, and the technical common sense in the present field. Further, a reference sign X in each figure represents the "width direction", and a reference sign Z represents the "thickness direction". Incidentally, the dimensional relation (such as length, width, or thickness) does not reflect the actual dimensional relation.

Further, it is assumed that the expression of "A to B (provided that A or B is a given value) showing the range in the present specification means A or more and B or less.

In the present specification, the term "battery" is a term denoting an electric storage device capable of extracting the electric energy in general, and is a concept including a primary battery and a secondary battery. The term "secondary battery" is a term denoting an electric storage device capable of repeatedly charging and discharging in general, and including a so-called storage battery, and an electric storage element such as an electric double layer capacitor. Further, in the present specification, the term "lithium ion secondary battery" denotes a secondary battery using lithium ions as electric charge carriers, and implementing charging and discharging by the transfer of electric charges accompanying lithium ions between the positive and negative electrodes.

Figure 1:
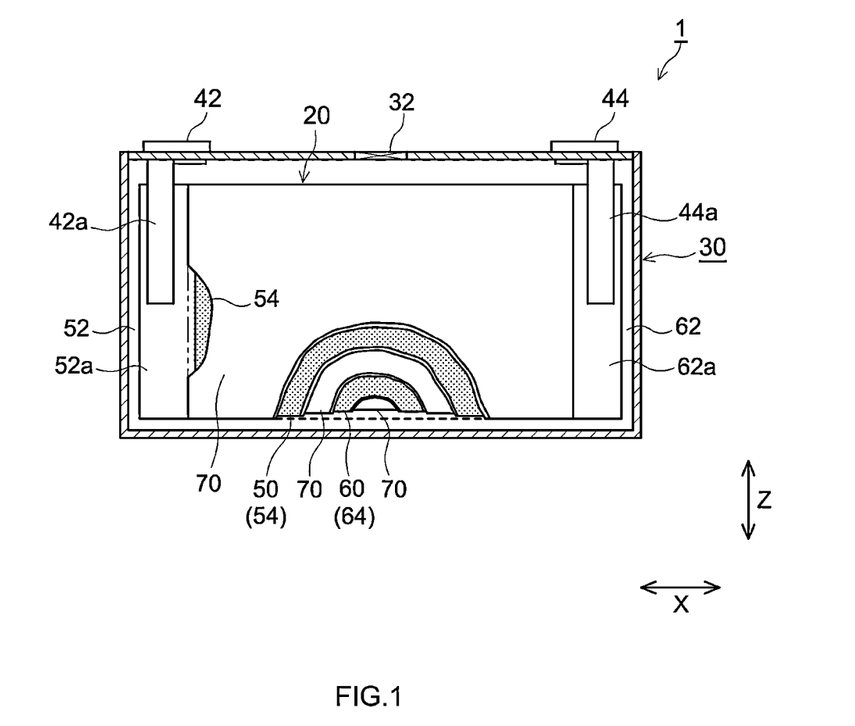
FIG. 1 is a cross sectional view schematically showing the internal structure of a lithium ion secondary battery in accordance with one embodiment.

FIG. 1 is a cross sectional view schematically showing a lithium ion secondary battery in accordance with one embodiment. As shown in FIG. 1, a lithium ion secondary battery 1 is a closed type battery constructed by accommodating a wound electrode body 20 in a flat shape and a nonaqueous electrolyte (not shown) in a flat battery case (i.e., an exterior container) 30. The battery case 30 is provided with a positive electrode terminal 42 and a negative electrode terminal 44 for external connection, and a thin-walled safety valve 32 set for releasing the internal pressure when the internal pressure of the battery case 30 increases to a prescribed level, or higher. The positive electrode terminal 42 is electrically connected with a positive electrode collector sheet 42a. The negative electrode terminal 44 is electrically connected with a negative electrode collector sheet 44a. As the material for the battery case 30, for example, a metal material which is lightweight and has good thermal conductivity such as aluminum is used.

Figure 2:
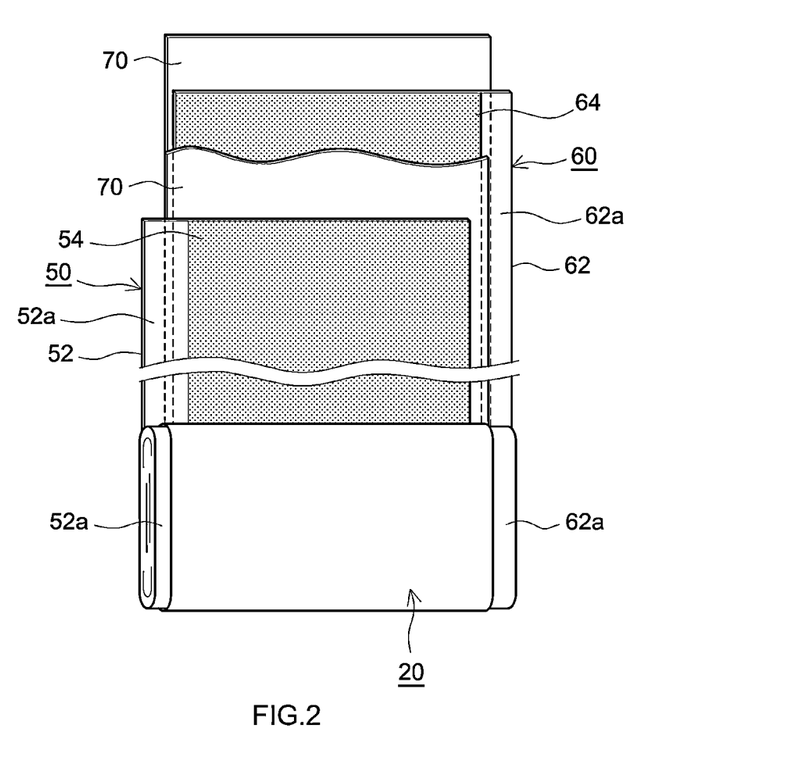
FIG. 2 is view schematically showing the configuration of a wound electrode body of a lithium ion secondary battery in accordance with one embodiment.

The wound electrode body 20 has a form in which rectangular sheet-shaped positive electrode (which will be hereinafter referred to as a "positive electrode sheet 50") and a rectangular sheet-shaped negative electrode (which will be hereinafter referred to as a "negative electrode sheet 60") are stacked one on another via two long separators (which will be hereinafter referred to as separator sheets 70), and are wound in the longitudinal direction as shown in FIGS. 1 and 2. The positive electrode sheet 50 has a configuration in which a positive electrode active material layer 54 is formed along the longitudinal direction on one surface or both surfaces of a long positive electrode collector 52. The negative electrode sheet 60 has a configuration in which a negative electrode active material layer 64 is formed along the longitudinal direction on one surface or both surfaces of a long negative electrode collector 62. One edge in the width direction of the positive electrode collector 52 is provided with a portion at which the positive electrode active material layer 54 is not formed along the edge, and the positive electrode collector 52 is exposed (i.e., a positive electrode collector exposed part 52a). The other edge in the width direction of the negative electrode collector 62 is provided with a portion at which the negative electrode active material layer 64 is not formed along the edge, and the negative electrode collector 62 is exposed (i.e., a negative electrode collector exposed part 62a). The positive electrode collector exposed part 52a and the negative electrode collector exposed part 62a are joined with the positive electrode collector sheet 42a and the negative electrode collector sheet 44a, respectively.

As the positive electrode collector 52, a conventionally known positive electrode collector for use in a lithium ion secondary battery may be used. As one example thereof, mention may be made of a sheet or foil made of a metal with good electric conductivity (e.g., aluminum, nickel, titanium, or stainless steel). The positive electrode collector 52 is preferably, for example, aluminum foil. The dimension of the positive electrode collector 52 has no particular restriction, and may be appropriately determined according to the battery design. When aluminum foil is used as the positive electrode collector 52, the dimension is, for example, preferably 5 µm or more and 35 µm or less, and more preferably 7 µm or more and 20 µm or less.

The positive electrode active material layer 54 includes the positive electrode active material herein disclosed. The positive electrode active material layer 54 may include other components than the positive electrode active material, for example, trilithium phosphate, a conductive material, and a binder. As the conductive material, for example, carbon black such as acetylene black (AB), or other carbon materials (e.g., graphite) can be preferably used. As the binder, for example, polyvinylidene fluoride (PVDF) can be used. Further, other materials than the foregoing ones (e.g., various additives) may be included therein unless the effects of the present disclosure are impaired.

Although not particularly restricted, the content of the positive electrode active material in the positive electrode active material layer 54 (i.e., the content of the positive electrode active material based on the total mass of the positive electrode active material layer 54) is preferably 70 mass % or more, more preferably 80 mass % or more and 97 mass % or less, and further preferably 85 mass % or more and 96 mass % or less. The content of trilithium phosphate in the positive electrode active material layer 54 is preferably, for example, 1 mass % or more and 15 mass % or less, and more preferably 2 mass % or more and 12 mass % or less. The content of the conductive material in the positive electrode active material layer 54 is preferably, for example, 1 mass % or more and 15 mass % or less, and more preferably 3 mass % or more and 13 mass % or less. The content of the binder in the positive electrode active material layer 54 is, for example, preferably, 1 mass % or more and 15 mass % or less, and more preferably 1.5 mass % or more and 10 mass % or less.

The thickness of the positive electrode active material layer 54 has no particular restriction, and is for example, preferably, 10 µm or more and 300 µm or less, and more preferably 20 µm or more and 200 µm or less.

As the negative electrode collector 62, a conventionally known negative electrode collector for use in a lithium ion secondary battery may be used. As one example thereof, mention may be made of a sheet or foil made of a metal with good electrical conductivity (e.g., copper, nickel, titanium, or stainless steel). The negative electrode collector 62 is preferably, for example, copper foil. The dimension of the negative electrode collector 62 has no particular restriction, and may be appropriately determined according to the battery design. When copper foil is used as the negative electrode collector 62, the dimension is, for example, preferably 5 µm or more and 35 µm or less, and more preferably 7 µm or more 20 µm or less.

The negative electrode active material layer 64 includes a negative electrode active material. As the negative electrode active material, for example, a carbon material such as graphite, hard carbon, or soft carbon can be preferably used. Graphite may be natural graphite or artificial graphite, and may be amorphous carbon coated graphite in a form in which graphite is coated with an amorphous carbon material.

The average particle diameter (median diameter: D50) of the negative electrode active material has no particular restriction, and is, for example, preferably 0.1 µm or more and 50 µm or less, and more preferably 1 µm or more and 25 µm or less. Incidentally, the average particle diameter (D50) of the negative electrode active material can be determined by, for example, the laser diffraction scattering method.

As the additive materials other than the negative electrode active material included in the negative electrode active material layer 64, mention may be made of a binder, a thickener, or the like. As the binder, for example, styrene butadiene rubber (SBR) can be preferably used. As the thickener, for example, carboxymethyl cellulose (CMC), or methyl cellulose (MC) can be preferably used. Further, other materials than the foregoing ones (e.g., various additives) may be included unless the effects of the present disclosure are impaired.

Although not particularly restricted, the content of the negative electrode active material in the negative electrode active material layer 64 is preferably 90 mass % or more, and more preferably 95 mass % or more and 99 mass % or less. The content of the binder in the negative electrode active material layer 64 is, for example, preferably 0.1 mass % or more and 8 mass % or less, and more preferably 0.5 mass % or more and 3 mass % or less. The content of the thickener in the negative electrode active material layer 64 is, for example, preferably 0.3 mass % or more and 3 mass % or less, and more preferably 0.5 mass % or more and 2 mass % or less.

The thickness of the negative electrode active material layer 64 has no particular restriction, and is, for example, preferably 10 µm or more and 300 µm or less, and more preferably 20 µm or more and 200 µm or less.

Examples of the separator sheet 70 may include a porous sheet (film) including a resin such as polyethylene (PE), polypropylene (PP), polyester, cellulose, or polyamide. Such a porous sheet may be a monolayered structure, or a lamination structure of two or more layers (e.g., a three-layered structure in which PP layers are stacked on both surfaces of a PE layer). The separator sheet 70 may be provided with a heat resistant layer (HRL).

For the nonaqueous electrolyte, the same one as that of a conventional lithium ion secondary battery can be used. Typically, the one obtained by allowing a support salt to be included in an organic solvent (nonaqueous solvent) can be used. As the nonaqueous solvents, organic solvents such as carbonates, esters, ethers, nitriles, sulfones, and lactones can be used without particular restriction. Specifically, for example, nonaqueous solvents such as ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC) can be preferably used. Such nonaqueous solvents can be used singly alone, or in appropriate combination of two or more thereof.

As the support salt, for example, a lithium salt such as $LiPF_6$, $LiBF_4$, or $LiClO_4$ can be preferably used. The concentration of the support salt has no particular restriction, and is preferably about 0.7 mol/L or more and 1.3 mol/L or less.

Incidentally, the nonaqueous electrolyte may include other components than the nonaqueous solvent and the support salt, for example, various additives including a film forming agent such as oxalate complex; a gas generator such as biphenyl (BP) or cyclohexyl benzene (CHB); a dispersant; and a thickener; and the like unless the effects of the present disclosure are remarkably impaired.

A lithium ion secondary battery 1 can be manufactured in the same manner as the conventionally known method, except for using the positive electrode active material herein disclosed as the positive electrode active material.

Figure 3:
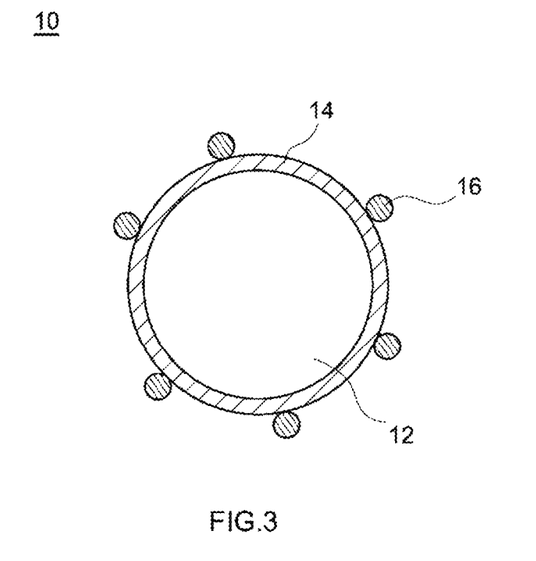
FIG. 3 is a view schematically showing one example of a positive electrode active material for use in a lithium ion secondary battery in accordance with one embodiment.

Then, the positive electrode active material for use in the present embodiment will be described. FIG. 3 is a view schematically showing one example of a positive electrode active material 10 for use in a lithium ion secondary battery 1 in accordance with the present embodiment. As shown in FIG. 3, the positive electrode active material 10 includes a core part 12, a first region 14, and a second region 16. Below, each will be described.

(a) Core Part

The core part 12 is a particle including a lithium composite oxide. The crystal structure of the lithium composite oxide has no particular restriction, and may be a layered structure, a spinel structure, an olivine structure, or the like. The lithium composite oxide is preferably a lithium transition metal composite oxide including at least one of Ni, Co, and Mn as a transition metal element. Specifically, mention may be made of a lithium manganese type composite oxide, a lithium nickel manganese type composite oxide, a lithium nickel cobalt manganese type composite oxide, a lithium nickel cobalt aluminum type composite oxide, a lithium iron nickel manganese type composite oxide, or the like.

The lithium composite oxide preferably has a layered structure because the initial resistance is small, and is more preferably a lithium nickel cobalt manganese type composite oxide of a layered structure.

Incidentally, in the present specification, the "lithium nickel cobalt manganese type composite oxide" is a term including, other than an oxide having Li, Ni, Co, Mn, or O as a constituent element, also an oxide including one or two or more additive elements other than these. Examples of such an additive element may be metal elements such as W, Mg, Ca, Al, V, Cr, Y, Zr, Nb, Mo, Hf, Ta, Na, Fe, Zn, and Sn, and non-metal elements such as S, F, Cl, Br, and I. This also applies to the case where the lithium manganese type composite oxide, lithium nickel manganese type composite oxide, lithium nickel cobalt aluminum type composite oxide, lithium iron nickel manganese type composite oxide, or the like is used as the core part 12.

From the viewpoint of the reduction of the initial resistance and the suppression of the resistance increase rate of the secondary battery, the additive element to the core part 12 is in particular preferably tungsten (W). On the other hand, when the W concentration in the core part 12 becomes too high, tungsten may be eluted from the positive electrode, and may be precipitated at the negative electrode. This facilitates precipitation of lithium on the negative electrode, which undesirably may cause deterioration of the negative electrode. In consideration of such points, the W concentration of the core part 12 is preferably 1 mol % or less, preferably 0.8 mol % or less, and preferably 0.5 mol % or less. Incidentally, the presence or absence of tungsten in the core part 12 does not restrict the present disclosure. Namely, the W concentration in the core part may be 0 mol %.

The "W concentration in the core part" in the present specification can be determined by the following procedure. First, using energy dispersive X-ray spectroscopy (TEM-EDX), a plurality of (e.g., 20) given positive electrode active materials 10 are photographed. Measurement sites each with a radius of 3 nm with the position 150 nm from the surface of the first region 14 toward the core part 12 as the center are set. Then, for each positive electrode active material 10, a plurality of (e.g., 5) measurement site are set. Thus, the number of atoms of the transition metal element (such as Ni, Co, Mn, or W) forming the positive electrode active material in each measurement site is measured. Then, the proportion of the number of atoms of W with the total number of atoms of the transition metal elements forming the positive electrode active material measured at each measurement site taken as 100 mol % is calculated. The average value of such values is herein referred to as the "W concentration in the core part".

The shape of the core part 12 has no particular restriction, and may be a spherical shape, a sheet shape, a needle shape, an amorphous shape, or the like. Alternatively, the core part 12 may be in a form of a secondary particle including primary particles aggregated therein, or in a hollow form. The average particle diameter (median diameter: D50) of the core part 12 is, for example, 0.05 μm or more and 20 μm or less, preferably 1 μm or more and 20 μm or less, and more preferably 3 μm or more and 15 μm or less. Incidentally, the average particle diameter (D50) of the core part 12 can be determined by, for example, the laser diffraction scattering method.

Incidentally, the core part 12 can be manufactured by, for example, in the following manner. The precursor (e.g., metal hydroxide) of the lithium composite oxide is manufactured by the crystallization method, or the like, and lithium is introduced to the precursor. As a result, the core part 12 can be manufactured.

(b) First Region

A first region 14 is formed on at least a partial surface of the core part 12. Such a first region 14 is a region including tungsten (W). The W concentration in the first region 14 is higher than the W concentration in the core part 12 (i.e., tungsten is concentrated). With such a configuration, it is possible to prevent the deterioration of the positive electrode active material 10 due to elimination of oxygen of the core part 12, and to improve the cycle characteristic of the battery. Further, the diffusibility of Li ions of the positive electrode active material 10 can be improved, which can also contribute to the improvement of the output characteristic of the battery.

Typically, the first region 14 includes a metal oxide including W and other elements. The "other elements" in such a first region 14 may be the same kind of elements as the constituent elements of the core part 12. Namely, the first region 14 may include Li, Mg, Ca, Al, V, Cr, Y, Zr, Nb, Mo, Hf, Ta, Na, Fe, Zn, Sn, S, F, Cl, Br, I, or the like other than W. Incidentally, the constituent elements of the first region 14 may be the same as, or may be not the same as the constituent elements of the core part 12. For example, when the core part 12 includes a tungsten-containing lithium nickel cobalt manganese type composite oxide, the first region 14 may include a tungsten-containing lithium nickel cobalt manganese type composite oxide, or may include a tungsten-containing lithium cobalt type composite oxide, a tungsten-containing lithium manganese type composite oxide, a tungsten-containing lithium nickel type composite oxide, or the like. However, in consideration of the ease of the formation thereof on the core part 12, the constituent elements of the first region 14 are preferably the same as the constituent elements of the core part 12.

The first region 14 is formed on at least a partial surface of the core part 12. However, the first region 14 may be formed on the entire surface of the core part 12 as shown in FIG. 3. The reference of the W concentration of the core part 12 is set at the W concentration at the position 150 nm from the first region 14 toward the core part 12. Accordingly, the thickness of the first region 14 is less than 150 nm. The thickness of the first region 14 is, for example, preferably 10 nm or more and 100 nm or less, and preferably 15 nm or more and 80 nm or less. The thickness of the first region 14 can be determined by, for example, observing the cross section of the positive electrode active material 10 by TEM-EDX.

The lower limit of the W concentration in the first region 14 may only be a higher concentration than the W concentration in the core part 12, and for example, may be 0.1 mol % or more, may be 0.5 mol % or more, and may be 1 mol % or more. As described above, when the W concentration is too high, tungsten may be eluted from the positive electrode, which may cause deterioration of the negative electrode. For this reason, the W concentration is, for example, preferably 3 mol % or less, preferably 2.5 mol % or less, and preferably 2 mol % or less.

Incidentally, the "W concentration in the first region" in the present specification can be measured by the same procedure as with the "W concentration in the core part" described above. Namely, using TEM-EDX, a plurality of (e.g., 20) given positive electrode active materials 10 are photographed. A plurality of measurement sites are set in the vicinity of the surface of each positive electrode active material 10, and the W concentrations (mol %) at the plurality of measurement sites are calculated, and then, the average value thereof is determined. Incidentally, the measurement site for determining the "W concentration in the first region" is set at a position with a radius of 3 nm with the position 5 nm from the surface of the first region 14 toward the core part 12 as the center.

Incidentally, the particle having the first region 14 at at least a partial surface of the core part 12 can be manufactured by, for example, the following procedure. With the precursor of the core part 12 dispersed in a solution having a higher composition ratio of W (e.g., W/(W+Ni+Co+Mn)) than that of the solution for use in forming the core part 12, the crystallization method is performed. This can result in the formation of a precursor particle in which the precursor of the first region 14 is formed on the surface of the precursor of the core part 12. Then, lithium is introduced into such a precursor particle. As a result, it is possible to form the first region 14 in which tungsten is concentrated on at least a partial surface of the core part 12.

(c) Second Region

A second region 16 is formed on at least partial surface of the first region 14. Such a second region 16 is a region including titanium (Ti). With such a configuration, it is possible to suppress the elution of tungsten from the tungsten-concentrated first region 14. As a result of this, it is possible to achieve provision of the positive electrode active material for imparting a nonaqueous electrolyte secondary battery with excellent output characteristic and cycle characteristic. The second region 16 includes titanium dioxide ($TiO_2$) and/or a composite oxide including Li and Ti as titanium-containing compounds.

As the crystal structures of $TiO_2$, generally, anatase type (tetragonal), rutile type (tetragonal), brookite type (rhombic), and the like are known. The brookite type crystal structure is very unstable as compared with the anatase type and rutile type crystal structures. For example, when the brookite type $TiO_2$ is heated to 650° C. or more, transition to the most stable rutile type $TiO_2$ is caused.

When the second region 16 includes $TiO_2$ as a titanium-containing compound, as $TiO_2$, those selected from the group consisting of the brookite type, the anatase type, and the rutile type can be used singly alone, or in mixture of two or more thereof. Particularly, from the viewpoint of improving the output characteristic, the brookite type $TiO_2$ is preferably used.

The reason why the inclusion of the brookite type $TiO_2$ in the second region 16 improves the output characteristic of a secondary battery has no particular restriction, and can be considered as follow. The brookite type $TiO_2$ has an unstable crystal structure, and hence tends to form a complex with Li ions. For this reason, at least a partial surface of the first region 14 is provided with coating including the brookite type $TiO_2$, which speeds up the insertion/extraction of Li ions into/from the positive electrode active material 10. Therefore, the activation energy can be reduced, which can reduce the resistance. As a result of this, it is possible to improve the output characteristic of a secondary battery.

Incidentally, the inclusion of the brookite type $TiO_2$ in the second region 16 can be confirmed by a conventionally known method. For example, the inclusion of the brookite type $TiO_2$ in the second region 16 can be confirmed by performing X-ray absorption fine structure (XAFS) analysis on the second region 16, and analyzing the Ti peak.

The Ti concentration of the brookite type $TiO_2$ in the second region 16 is, for example, preferably 1 mol % or more, more preferably 5 mol % or more, and further preferably 10 mol % or more with the Ti concentration of the titanium-containing compound included in the second region 16 taken as 100 mol %. The Ti concentration of the brookite type $TiO_2$ in the second region 16 may be, for example, 100 mol % (i.e., the overall titanium-containing compound includes the brookite type $TiO_2$).

Incidentally, the "Ti concentration of the brookite type $TiO_2$ in the second region" can be determined by Ti peak analysis by XAFS. Although specific measurement device and measurement conditions will be described in examples described later, for example, the Ti peaks of standard samples of Ti included in the titanium-containing compound are respectively determined by XAFS analysis. Then, the Ti peak of the positive electrode active material 10 (target sample) including the second region 16 is determined by XAFS analysis. The Ti peak of such a standard sample, and the Ti peak of the target sample are subjected to fitting using the analysis software of XAFS (such as Athena or Artemis), thereby to be quantified. This value is herein referred to as the "Ti concentration of the brookite type $TiO_2$ in the second region".

The brookite type $TiO_2$ has a very unstable crystal structure, and hence has been difficult to use as a coating. However, the present inventors conducted a close study thereon, and as a result, found that a mechanochemical treatment can form the second region 16 including the brookite type $TiO_2$ on at least a part of the first region 14.

When the second region 16 includes a composite oxide including Li and Ti as a titanium-containing compound, for example, a lithium titanium composite oxide (or lithium titanate) such as $Li_2TiO_3$ or $Li_4Ti_5O_{12}$ can be used. As the composite oxide including Li and Ti, lithium titanium composite oxides (or lithium titanate) having different atomic ratios (Li/Ti) of Li to Ti can be used in mixture of two or more thereof.

Incidentally, the lithium titanium composite oxide (or lithium titanate) may be synthesized by a conventionally known synthesis method, or may be prepared by purchasing a commercially available product.

The second region 16 is preferably formed so that the atomic ratio (Ti/W) of Ti with respect to the number of atoms of W included in the overall positive electrode active material 10 may become 0.01 or more and 10 or less, more preferably 0.03 or more and 10 or less, further preferably 0.2 or more and 9 or less, and in particular preferably 0.6 or more and 3.5 or less.

Incidentally, the number of atoms of W included in the positive electrode active material 10 and the number of atoms of Ti included in the second region 16 can be determined by, for example, ICP analysis.

The second region 16 may only be typically present (i.e., be interspersed) on at least a partial surface of the first region 14 as shown in FIG. 3, and has no particular restriction on the form. For example, the second region 16 may be formed on the entire surface of the first region 14. However, from the viewpoint of the battery characteristics, preferably, the second region 16 is interspersed on at least a partial surface of the first region 14, and partially coats the first region 14. The thickness of the second region 16 has no particular restriction, and is, for example, 0.1 nm or more and 100 nm or less. The thickness of the second region 16 can be determined by, for example, observing the cross section of the positive electrode active material 10 by TEM-EDX.

Incidentally, the positive electrode active material particle including the core part 12, the first region 14, and the second region 16 can be manufactured by, for example, the following procedure. A particle including the core part 12 and the first region 14, and a titanium-containing compound particle are charged into a mechanochemical device, and are subjected to a mechanochemical treatment for a prescribed time. As a result, it is possible to manufacture the positive electrode active material 10 including the core part 12, the first region 14, and the second region 16.

The lithium ion secondary battery 1 configured as described up to this point is usable for various uses. For example, the lithium ion secondary battery 1 can be preferably used as a high output power source for a motor to be mounted on an automobile (driving power supply). The kind of the automobile has no particular restriction. Typically, mention may be made of a vehicle, for example, a plug-in hybrid electric vehicle (PHEV), a hybrid electric vehicle (HEV), or a battery electric vehicle (BEV). The lithium ion secondary battery 1 can also be used in a form of an assembled battery including a plurality of batteries electrically connected to one another.

Below, test examples regarding the present disclosure will be described. However, it is not intended that the present disclosure is limited to such test examples.

Example 1

First, an aqueous solution obtained by dissolving a sulfuric acid salt of a metal other than Li in water was prepared. Specifically, a first raw material aqueous solution including Ni, Co, Mn, and W so as to achieve molar ratios of Ni, Co, Mn, and W of 1:1:1:0.0015 was prepared in a reaction vessel. NaOH and aqueous ammonia were added to the first raw material aqueous solution in the reaction vessel for neutralization. As a result, a composite hydroxide including metals (Ni, Co, Mn, and W) other than Li to be the precursor of the core part was crystallized.

Then, a raw material aqueous solution (second raw material aqueous solution) with a higher W concentration than that of the first raw material aqueous solution was prepared. The second raw material aqueous solution was specifically prepared so that the molar ratios of Ni, Co, Mn, and W became 1:1:1:0.02. Such a second raw material aqueous solution was supplied into the mixed aqueous solution including the precursor of the core part crystallized therein, thereby forming a composite hydroxide particle (precursor particle) in which the precursor of the first region was formed on the surface of the precursor of the core part.

The formed precursor particle was washed with water, followed by filtration, and drying. Then, the precursor particle after drying and lithium carbonate were mixed so as to achieve molar ratios of (Ni+Co+Mn):Li of 1.16:1. The mixture was burnt at a temperature of 870° C. for 15 hours. Such a mixture was cooled to room temperature (25° C.±5° C.), and was subjected to a disaggregation treatment. As a result of this, a spheroidal particle (burnt powder) including primary particles each having the core part and the first region aggregated therein was obtained.

The manufactured burnt powder, and a titanium-containing compound powder (a mixed powder of a $TiO_2$ powder and a $Li_2TiO_3$ powder) were charged into a mechanochemical device, and were subjected to a mechanochemical treatment at 6000 rpm for 30 minutes.

Incidentally, the atomic ratio (Ti/W) of Ti with respect to W in the manufactured positive electrode active material was confirmed by quantitative analysis using an ICP emission analyzer (ion chromatograph ISC-5000 manufactured by Nippon Dionex K.K.).

Examples 2 to 5

By changing the molar ratios of Ni, Co, Mn, and W of the first raw material aqueous solution and the second raw material aqueous solution of Example 1, the W concentrations of the core part and the first region were changed. Further, the mechanochemical treatment was performed under the foregoing conditions. At this step, by changing the amount of the titanium-containing compound powder based on the amount of the burnt powder, the atomic ratio (Ti/W) of Ti with respect to W was changed. Specifically, the results are shown in Table 1.

Example 6

First, an aqueous solution obtained by dissolving a sulfuric acid salt of a metal other than Li in water was prepared. Specifically, a first raw material aqueous solution including Ni, Co, and Mn so as to achieve molar ratios of 1:1:1 was prepared in a reaction vessel. NaOH and aqueous ammonia were added to the first raw material aqueous solution in the reaction vessel for neutralization. As a result, a composite hydroxide including metals other than Li to be the precursor of the core part was crystallized. Then, the second raw material aqueous solution obtained by adding W to the first raw material aqueous solution was supplied into the mixed aqueous solution including the precursor of the core part crystallized therein, thereby forming a composite hydroxide particle (precursor particle) in which the precursor of the first region was formed on the surface of the precursor of the core part. Namely, the composite oxide particle not including W at the core part was formed. As described above, Li was introduced, resulting in a spheroidal particle (burnt powder) including primary particles aggregated therein.

Such a burnt powder and a titanium-containing compound powder were charged into a mechanochemical device, and were subjected to a mechanochemical treatment under the foregoing conditions, resulting in an active material of Example 6.

Comparative Example 1

In the same manner as in Example 6, a composite hydroxide including metals other than Li to be the precursor of the positive electrode active material was crystallized. The resulting composite hydroxide and lithium carbonate were mixed so as to achieve molar ratios of (Ni+Co+Mn):Li of 1:1. The mixture was burnt at a temperature of 870° C. for 15 hours. Such a mixture was cooled to room temperature (25° C.±5° C.), and was subjected to a disaggregation treatment. As a result of this, a spheroidal particle (burnt powder) including primary particles aggregated therein was obtained. Such a burnt powder was used as it was (i.e., without being subjected to a mechanochemical treatment) as an active material of Comparative Example 1. The active material of Comparative Example 1 is an active material not including the first region and the second region.

Comparative Example 2

The burnt powder manufactured by the same procedure as with Examples 1 to 5 was used without being subjected to a mechanochemical treatment (i.e., without being provided with the second region) as an active material of Comparative Example 2.

Comparative Example 3

The burnt powder of Comparative Example 1 and a titanium-containing compound powder were charged into a mechanochemical device, and were subjected to a mechanochemical treatment under the foregoing conditions, resulting in an active material of Comparative Example 3.

Comparative Example 4

Using the second raw material aqueous solution with a lower W concentration than that of the first raw material aqueous solution, a spheroidal particle (burnt powder) including primary particles in each of which the W concentration of the first region was lower than that of the core part aggregated therein was manufactured. Such a burnt powder and a titanium-containing compound powder were charged into a mechanochemical device, and were subjected to a mechanochemical treatment under the foregoing conditions, resulting in an active material of Comparative Example 4.

Measurement of W Concentration

Using TEM-EDX (TEM device: JFE-ARM300F, EDX device: JED-2300T manufactured by JEOL), 10 positive electrode active materials of each example were photographed, and the site having a radius of 3 nm with the position 150 nm from the surface of the first region toward the core part was set as the measurement site. Then, in each of the positive electrode active materials to be measured, 5 such measurement sites were set, and each number of atoms of the transition metal elements (Ni, Co, Mn, and W) at each measurement site was measured. Then, the proportion of the number of atoms of W with the total number of atoms of the transition metal elements measured at each measurement site taken as 100 mol % was calculated, thereby calculating the "W concentration in the core part". Further, the "W concentration in the first region" was calculated in the same manner except for setting the measurement site at the position 5 nm from the surface of the first region toward the core part. The results are shown in Table 1.

Manufacturing of Evaluating Lithium Ion Secondary Battery

Each active material of respective Examples and respective Comparative Examples manufactured, acetylene black (AB) as a conductive material, polyvinylidene fluoride (PVDF) as a binder, and N-methyl pyrrolidone (NMP) as a disperse medium were mixed using a planetary mixer, thereby preparing a positive electrode active material layer forming paste. At this step, the mass ratios of the active material, AB, and PVDF were set at 90:8:2, and the solid content concentration was set at 56%. Using a die coater, such a paste was applied onto both surfaces of aluminum foil, and was dried, followed by pressing, thereby manufacturing a positive electrode sheet.

Further, natural graphite (C) as a negative electrode active material, styrene butadiene rubber (SBR) as a binder, and carboxyl methyl cellulose (CMC) as a thickener were mixed at mass ratios of C:SBR:CMC=98:1:1 in ion exchanged water, thereby preparing a negative electrode active material layer forming paste. Using a die coater, such a paste was applied onto both surfaces of copper foil, and was dried, followed by pressing, thereby manufacturing a negative electrode sheet.

As the separator sheets, two porous polyolefin sheets each having a three-layered structure of PP/PE/PP, and having a thickness of 24 μm were prepared.

The manufactured positive electrode sheet and negative electrode sheet, and the prepared two separator sheets were stacked one on another, and were wound, thereby manufacturing a wound electrode body. Electrode terminals were mounted on the positive electrode sheet and the negative electrode sheet of the manufactured wound electrode body by welding, respectively. This was accommodated in a battery case having a liquid injection port.

A nonaqueous electrolyte was injected from such a liquid injection port, and the liquid injection port was hermetically sealed by a sealing lid. Incidentally, as the nonaqueous electrolyte, the one obtained by dissolving $LiPF_6$ as a support salt in a mixed solvent including ethylene carbonate (EC), dimethyl carbonate (DMC), and ethyl methyl carbonate (EMC) at volume ratios of 1:1:1 in a concentration of 1.0 mol/L was used. In the manner described up to this point, an evaluating lithium ion secondary battery was obtained.

Activating Treatment

Under 25° C. environment, each evaluating lithium ion secondary battery was subjected to an activating treatment (first charging). The activating treatment was performed in the following manner: with the constant current—constant voltage system, constant current charging was performed at a current value of ⅓ C up to 4.2 V, and then, constant voltage charging was performed until the current value became ​1/50 C, resulting in a fully charged state. Subsequently, constant current discharging was performed until the voltage became 3.0 V at a current value of ⅓ C.

Output Characteristic Evaluation

Each evaluating lithium ion secondary battery after the activating treatment was adjusted to an open voltage of 3.80 V, and then was placed under temperature environment of −30° C. Discharging was performed at a current value of 1 C for 2 seconds, thereby determining the voltage drop amount (Δ V). Such a voltage drop amount Δ V was divided by the discharge current value (1 C), thereby calculating the battery resistance, which was referred to as the initial resistance. The initial resistance ratios of other Comparative Examples and Examples with the initial resistance of Comparative Example 1 taken as 1 were determined. Incidentally, it can be evaluated that the output characteristic becomes better with a decrease in initial resistance ratio. The results are shown in Table 1.

Cycle Characteristic Evaluation

Each evaluating lithium ion secondary battery measured for the initial resistance was placed under 0° C. environment. Thus, the charging and discharging cycle including constant current charging at 30 C to 4.3 V, and constant current discharging at 30 C to 3.1 V as one cycle was repeated for 500 cycles. The battery resistance at the 500th cycle was measured in the same manner as described above. As the indicator of the resistance increase, the resistance increase rate was determined by the formula: (battery resistance at 500th charging and discharging cycle—initial resistance)/initial resistance. The ratios of the resistance increase rates of other Comparative Examples and Examples with the resistance increase rate of Comparative Example 1 taken as 1 were determined. Incidentally, it can be evaluated that the cycle characteristic becomes better with a decrease in such a ratio of the resistance increase rate. The results are shown in Table 1.

TABLE 1

|  | W concentration of core part (mol %) | W concentration of first region (mol %) | Presence or absence of second region | Ti/W | Initial resistance ratio | Ratio of resistance increase rate |
|---|---|---|---|---|---|---|
| Comparative Example 1 | 0 | 0 | None | — | 1 | 1 |
| Comparative Example 2 | 0.2 | 0.7 | None | — | 0.94 | 0.90 |
| Comparative Example 3 | 0 | 0 | Present | — | 0.89 | 0.86 |
| Comparative Example 4 | 0.5 | 0.4 | Present | 0.9 | 0.91 | 0.91 |
| Example 1 | 0.8 | 1.5 | Present | 0.03 | 0.86 | 0.84 |
| Example 2 | 0.3 | 1 | Present | 0.2 | 0.67 | 0.73 |
| Example 3 | 0.2 | 0.6 | Present | 0.6 | 0.55 | 0.70 |
| Example 4 | 0.2 | 0.5 | Present | 0.9 | 0.56 | 0.67 |
| Example 5 | 0.1 | 0.3 | Present | 3.5 | 0.60 | 0.64 |
| Example 6 | 0 | 0.1 | Present | 9 | 0.75 | 0.74 |

As shown in Table 1, it is indicated as follows: when the positive electrode active material has the core part including a lithium composite oxide, a first region formed on at least a partial surface of the core part, and including W, and a second region formed on at least a part of the first region, and including Ti, and the W concentration of the first region is higher than that of the core part, the initial resistance ratio and the ratio of the resistance increase rate are remarkably small. Therefore, the positive electrode active material herein disclosed can impart excellent output characteristic and cycle characteristic to a nonaqueous electrolyte secondary battery.

Further, the results of Examples 1 to 6 indicate as follows: when the atomic ratio (Ti/W) of Ti to W is 0.2 or more and 9 or less, the initial resistance ratio and the ratio of the resistance increase rate are very small; and when the atomic ratio (Ti/W) of Ti to W is 0.6 or more and 3.5 or less, the initial resistance ratio and the ratio of the resistance increase rate are particularly small.

Examples 7 to 11

The molar ratios of Ni, Co, Mn, and W of the first raw material aqueous solution and the second raw material aqueous solution were changed, resulting in a spheroidal particle (burnt powder) including primary particles in each of which the W concentrations of the core part and the first region were different, aggregated therein. Such a burnt powder and a titanium-containing compound powder (mixed powder of a $TiO_2$ powder and a $Li_2TiO_3$ powder) were charged into a mechanochemical device, and were subjected to a mechanochemical treatment under the foregoing conditions. Each $TiO_2$ powder used in Examples 7 to 11 includes a brookite type $TiO_2$ powder. By changing the amount of the brookite type $TiO_2$ powder based on the amount of the titanium-containing compound powder, the Ti concentration (mol %) of the brookite type $TiO_2$ in the second region was changed. Incidentally, the atomic ratio (Ti/W) of Ti to W of the overall positive electrode active material was adjusted so as to be constant.

The W concentrations of the core part and the first region of each of the active materials, and the atomic ratio (Ti/W) of Ti to W of the overall positive electrode active material were measured in the same manner as described above. The results are shown in Table 2.

The Ti concentration (mol %) of the brookite type $TiO_2$ in the second region was determined by XAFS analysis. The analysis conditions were set as follows.

Analyzer: Aichi Synchrotron Radiation Center BL5S1

Measurement method: transmission method (standard sample) and fluorescence method

Example

Monochrometer: double crystal spectrometer

Analyzing crystal: Si (111)

Measurement absorption edge: Ti-K absorption edge

Measurement energy region: 4800 eV to 6000 eV

Analysis software: Athena (Demeter ver. 0.9.26)

A standard sample of the brookite type $TiO_2$ and boron nitride were mixed at a molar ratio of 1:99 using a dancing mill. Further, a standard sample of $Li_2TiO_3$ and boron nitride were mixed at a molar ratio of 1:99 using a dancing mill. Such mixtures were pressed under a press pressure of 30 kN, thereby manufacturing each analyzing specimen. Such specimens were analyzed under the conditions of XAFS, thereby determining the Ti peak of the brookite type $TiO_2$ and the Ti peak of $Li_2TiO_3$.

Then, the active materials of Examples 7 to 10 were pressed under a press pressure of 30 kN, thereby manufacturing respective analyzing specimens. These were measured under the conditions of XAFS, and their respective Ti peaks were determined. The Ti peak of the brookite type $TiO_2$ and the Ti peak of $Li_2TiO_3$ determined by the measurement of the standard samples and the Ti peaks of respective examples (around 5000 eV) were subjected to fitting using analysis software Athena for quantification. The results are shown in Table 2.

Using the active materials, each evaluating lithium ion secondary battery was manufactured in the same manner as described above, and the output characteristic and the cycle characteristic were evaluated in the same manner as described above. Incidentally, the results shown in Table 2 are the initial resistance ratio and the ratio of the resistance increase rate of each Example when the result of Comparative Example 1 is assumed to be 1.

TABLE 2

|  | W concentration of core part (mol %) | W concentration of first region (mol %) | Ti/W | Ti concentration of brookite type $TiO_2$ (mol %) | Initial resistance ratio | Ratio of resistance increase rate |
|---|---|---|---|---|---|---|
| Comparative Example 1 | 0 | 0 | — | — | 1 | 1 |
| Example 7 | 0.2 | 0.6 | 0.9 | 6 | 0.80 | 0.72 |
| Example 8 | 0.1 | 0.5 | 0.9 | 11 | 0.69 | 0.70 |
| Example 9 | 0.1 | 0.5 | 0.9 | 58 | 0.58 | 0.66 |
| Example 10 | 0.2 | 0.5 | 0.9 | 72 | 0.56 | 0.67 |
| Example 11 | 0.2 | 0.7 | 0.9 | 100 | 0.58 | 0.67 |

Table 2 also shows the results of Comparative Example 1 together. It is indicated as follows: for any of Examples 7 to 11, as compared with Comparative Example 1, the initial resistance ratio and the ratio of the resistance increase rate are smaller. The results of Examples 7 to 11 indicate as follows: when the Ti concentration of the brookite type $TiO_2$ is 11 mol % or more, the initial resistance ratio and the ratio of the resistance increase rate are very small; and when the Ti concentration of the brookite type $TiO_2$ is 58 mol % or more, the initial resistance ratio and the ratio of the resistance increase rate are particularly small.

Up to this point, specific examples of the present disclosure were described in details. However, these are merely illustrative, and should not be construed as limiting the scope of the appended claims. The technology described in the appended claims includes various modifications and changes of the specific examples exemplified up to this point.

What is claimed is:

1. A positive electrode active material for use in a nonaqueous electrolyte secondary battery,
the positive electrode active material, comprising:
a core part including a lithium composite oxide;
a first region formed on at least a partial surface of the core part, and including tungsten (W); and
a second region formed on at least a partial surface of the first region, and including titanium (Ti), wherein the second region comprises a different material from the first region,
wherein a W concentration of the first region with TEM-EDX analysis is higher than a W concentration of the core part, and
the second region is configured such that an atomic ratio (Ti/W) of Ti to W in the overall positive electrode active material is 0.2 or more and 0.9 or less.

2. The positive electrode active material according to claim 1,
wherein the second region includes $TiO_2$ and/or a composite oxide including Li and Ti as titanium-containing compounds.

3. The positive electrode active material according to claim 2,
wherein the second region includes $TiO_2$ as the titanium-containing compound, and a Ti concentration of $TiO_2$ identified as brookite type $TiO_2$ based on Ti peak analysis of XAFS with a Ti concentration of the titanium-containing compound taken as 100 mol % is 10 mol % or more.

4. A nonaqueous electrolyte secondary battery comprising a positive electrode, a negative electrode, and a nonaqueous electrolyte, wherein
the positive electrode includes the positive electrode active material according to claim 1.

5. The positive electrode active material according to claim 1,
wherein the first region is formed on an entire surface of the core part.

6. The positive electrode active material according to claim 1, wherein a thickness of the first region ranges from 10 nanometers (nm) to 100 nm.

7. The positive electrode active material according to claim 1, wherein the second region is interspersed on the at least partial surface of the first region, and the second region partially coats the first region.

8. The positive electrode active material according to claim 1, wherein the second region is configured such that the atomic ratio Ti/W in the overall positive electrode active material is 0.6 or more and 3.5 or less.

9. The positive electrode active material according to claim 1, wherein the second region includes a composite oxide including Li and Ti as titanium-containing compounds.

10. The positive electrode active material according to claim 1, wherein the second region includes $TiO_2$ and a composite oxide including Li and Ti as titanium-containing compounds.

11. A positive electrode active material for use in a nonaqueous electrolyte secondary battery,
the positive electrode active material, comprising:
a core part including a lithium composite oxide;
a first region formed on at least a partial surface of the core part, and including tungsten (W); and
a second region formed on at least a partial surface of the first region, and including titanium (Ti), wherein the second region comprises a different material from the first region,
wherein a W concentration of the first region with TEM-EDX analysis is higher than a W concentration of the core part, and
the second region is configured such that an atomic ratio (Ti/W) of Ti to W in the overall positive electrode active material is 3.5 or more to 9 or less.

* * * * *